(12) United States Patent
Sykes et al.

(10) Patent No.: US 9,127,719 B2
(45) Date of Patent: Sep. 8, 2015

(54) METHOD OF MANUFACTURING A BEARING ASSEMBLY

(71) Applicant: The Timken Company, North Canton, OH (US)

(72) Inventors: Robert C. Sykes, Pacolet, SC (US); Scott J. Brunner, Spartanburg, SC (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 14/408,042

(22) PCT Filed: Jul. 1, 2013

(86) PCT No.: PCT/US2013/048868
§ 371 (c)(1),
(2) Date: Dec. 15, 2014

(87) PCT Pub. No.: WO2014/011428
PCT Pub. Date: Jan. 16, 2014

(65) Prior Publication Data
US 2015/0167745 A1    Jun. 18, 2015

Related U.S. Application Data

(60) Provisional application No. 61/669,811, filed on Jul. 10, 2012.

(51) Int. Cl.
*F16C 43/06* (2006.01)
*F16C 33/52* (2006.01)
*F16C 19/26* (2006.01)
*F16C 33/46* (2006.01)

(52) U.S. Cl.
CPC ............ *F16C 43/065* (2013.01); *F16C 19/26* (2013.01); *F16C 33/46* (2013.01); *F16C 33/526* (2013.01); *Y10T 29/49687* (2015.01); *Y10T 29/49691* (2015.01)

(58) Field of Classification Search
CPC ........ F16C 43/065; F16C 33/46; F16C 19/26; F16C 33/526; Y10T 29/49691; Y10T 29/49687

See application file for complete search history.

(56) References Cited

U.S. PATENT DOCUMENTS

| | | | |
|---|---|---|---|
| 8,128,293 B2* | 3/2012 | Takahashi | 384/623 |
| 8,308,373 B2* | 11/2012 | Miyachi et al. | 384/574 |
| 2006/0239601 A1* | 10/2006 | Otaka et al. | 384/574 |
| 2010/0209037 A1* | 8/2010 | Miyachi et al. | 384/574 |
| 2010/0303401 A1 | 12/2010 | Takahashi | |

FOREIGN PATENT DOCUMENTS

| | | |
|---|---|---|
| DE | 10031427 | 1/2002 |
| EP | 2172664 | 4/2010 |
| JP | H11325063 | 11/1999 |

OTHER PUBLICATIONS

PCT/US2013/048868 Search Report and Written Opinion, Oct. 2, 2013, 11 pages.

\* cited by examiner

*Primary Examiner* — Ryan J Walters
(74) *Attorney, Agent, or Firm* — Michael Best & Friedrich LLP

(57) ABSTRACT

A method of manufacturing a bearing assembly includes the steps of providing first (38) and second (42) cage frames, each including a plurality of holes (46) spaced along a circumference of the respective first and second cage frames (38, 42), positioning a plurality of rollers (22) between the first and second cage frames (38, 42), each of the rollers (22) including a bore (26) coaxial with a rotational axis (30) of the respective rollers (22), aligning the bore (26) of a first of the plurality of rollers (22) with a first hole (46) in each of the respective first and second cage frames (38, 42), then sliding a threaded end (54) of a pin (50) through the first hole (46) in the first cage frame (38) and the first roller (22) a sufficient distance to engage the second cage frame (42). The method further includes rotating the pin (50) to form a screw thread in the first hole (46) of the second cage frame (42) with the threaded end (54) of the pin (50).

11 Claims, 2 Drawing Sheets

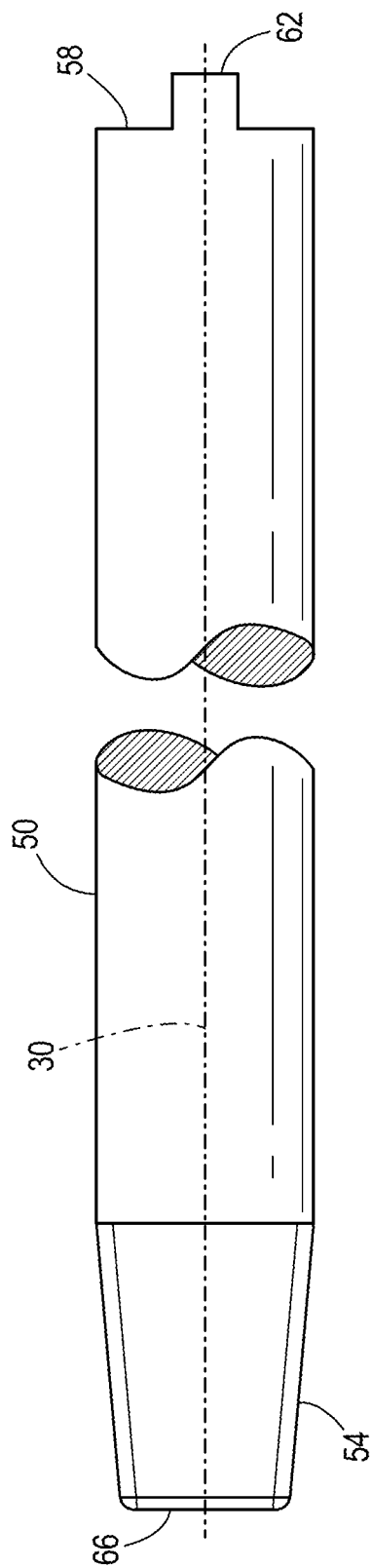
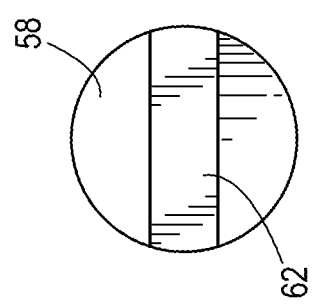

MMETHOD OF MANUFACTURING A BEARING ASSEMBLY

CROSS-REFERENCE TO RELATED APPLICATIONS

This application claims priority to U.S. Provisional Patent Application No. 61/669,811 filed on Jul. 10, 2012, the entire content of which is incorporated herein by reference.

FIELD OF THE INVENTION

The present invention relates to bearing assemblies, and more particularly to pin-type roller bearings.

BACKGROUND OF THE INVENTION

FIG. 1 illustrates a typical pin-type roller bearing assembly including an outer ring, an inner ring, and rollers arranged and positioned between the outer ring and the inner ring. A cage assembly maintains separation of the rollers and interconnects the rollers for uniform rotation with respect to the outer and inner rings. The cage assembly includes spaced cage frames between which the rollers are positioned, and pins having sufficient lengths to extend through holes in the respective cage frames and the rollers. Each pin has a threaded end that is received within a corresponding pre-threaded hole in one of the cage frames. Competing tolerances exist between the minimum torque value to which the threaded end of each pin should be tightened to the pre-threaded hole, and the protruded distance of the threaded end of each pin through the particular cage frame having the pre-threaded holes. Additionally, pre-threading numerous holes in one of the cage frames is a time-consuming and costly manufacturing step, requiring consumable tooling and specialized tolerance gages.

SUMMARY OF THE INVENTION

The invention provides, in one aspect, a method of manufacturing a bearing assembly. The method includes providing first and second cage frames, each including a plurality of holes spaced along a circumference of the respective first and second cage frames. The method also includes positioning a plurality of rollers between the first and second cage frames, each of the rollers including a bore coaxial with a rotational axis of the respective rollers. The method further includes aligning the bore of a first of the plurality of rollers with a first hole in each of the respective first and second cage frames, then sliding a threaded end of a pin through the first hole in the first cage frame and the first roller a sufficient distance to engage the second cage frame. The pin includes a head opposite the threaded end. The method further includes rotating the pin to form a screw thread in the first hole of the second cage frame with the threaded end of the pin.

Other features and aspects of the invention will become apparent by consideration of the following detailed description and accompanying drawings.

BRIEF DESCRIPTION OF THE DRAWINGS

FIG. 3 is a side view of a pin of the bearing assembly of FIG. 2.

FIG. 4 is an end view of the pin of FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
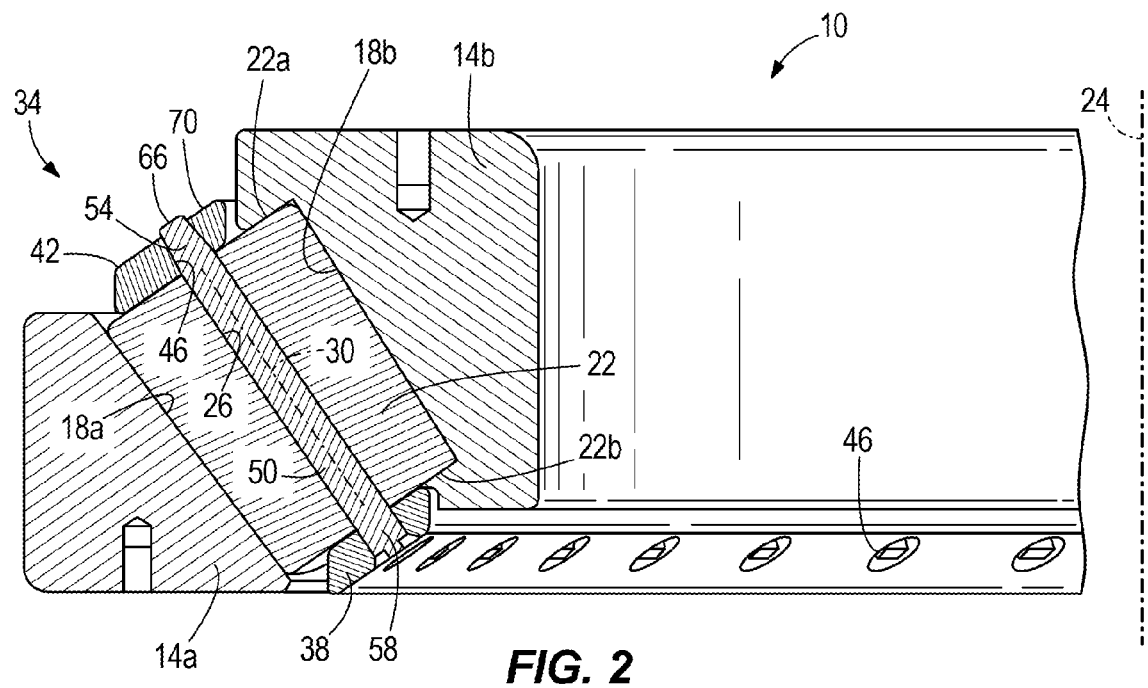
FIG. 2 is a partial cross-sectional view of a bearing assembly in accordance with an embodiment of the invention.

FIG. 2 illustrates a portion of a bearing assembly 10 according to an embodiment of the invention. The bearing assembly 10 includes spaced, coaxial rings 14a, 14b having respective raceways 18a, 18b and a plurality of rollers 22 positioned between the raceways 18a, b. In the illustrated construction of the bearing assembly 10, the rollers 22 are oriented such that each roller 22 has a first end 22a relatively farther from a central axis 24 of the bearing assembly 10 in a radial direction and a second end 22b relatively nearer to the central axis 24 in the radial direction. The rollers 22 are configured as tapered cylinders and are inclined with respect to the central axis 24 to allow the bearing assembly 10 to carry both a radial load and an axial (i.e., thrust) load. Alternatively, the rollers 22 may be configured in any of a number of different shapes, thereby imparting different configurations to the bearing assembly 10. Each of the plurality of rollers 22 includes a bore 26 coaxial with a rotational axis 30 of the respective rollers 22.

With continued reference to FIG. 2, the bearing assembly 10 further includes a cage assembly 34 including a first cage frame 38 and a second cage frame 42. In the illustrated construction of the bearing assembly 10, the second cage frame 42 is diametrically larger than the first cage frame 38. Alternatively, the cage frames 38, 42 may be the same size, or the first cage frame 38 may be larger than the second cage frame 42 depending upon the particular configuration and/or application of the bearing assembly 10. Each cage frame 38, 42 includes a plurality of holes 46 spaced equally from each other and arranged in a circular array on the respective cage frame 38, 42. The number of holes 46 in each of the cage frames 38, 42 is equal to the number of rollers 22 included in the bearing assembly 10. The cage assembly 34 further includes a plurality of pins 50 for coupling the rollers 22 to the first and second cage frames 38, 42. Each pin 50 has a threaded end 54 with a tapered shape and a head 58 opposite the threaded end (best illustrated in FIGS. 3 and 4). In other embodiments, the threaded end 54 can have a straight (i.e., not tapered) shape, or any other shape as may be desired. The threaded end 54 is hardened by quenching and tempering, precipitation hardening, carburizing, or another suitable method so that it has a hardness higher than that of the second cage frame 42. The head 58 includes a torque receiving portion 62 (e.g., a protrusion or slot) that is shaped to receive a torque input from a wrench, machine, or other source.

In at least the second cage frame 42, the holes 46 are first drilled to a diameter smaller than the diameter of the pins 50, and then reamed to a shape that generally matches the shape of the threaded ends 54 of the pins 50. In the illustrated embodiment, the holes 46 in the second cage frame 42 are reamed to a tapered shape that generally matches the tapered shape of the threaded ends 54 of the pins 50. The holes 46 in the first cage frame 38, however, are drilled to a slightly larger diameter to provide a snug, sliding fit with the pins 50. Each of the pins 50 is inserted through one of the holes 46 in the first cage frame 38 and extends through the bore 26 in a corresponding one of the rollers 22. The threaded end 54 of each pin 50 is received in a corresponding one of the holes 46 in the second cage frame 42. As is described in more detail below, the threaded end 54 of the pin 50 shapes or otherwise forms threads in the hole 46 as it is displaced into the hole 46. All of the rollers 22 are secured to the cage assembly 34 in this manner.

FIG. 2 illustrates the bearing assembly 10 post-assembly. A method of manufacturing the bearing assembly 10 in accordance with the invention is described below.

First, the ring 14b is provided on a horizontal support surface with the raceway 18b facing upwardly. The cage frames 38, 42 are then provided, each including a circular array of unthreaded holes 46. Further, the rollers 22 are positioned on the raceway 18b individually or as a group using a jig, and the first cage frame 38 is lowered onto the rollers 22 such that the first cage frame 38 is supported directly by the respective ends 22b of the rollers 22. The second cage frame 42 is then brought into contact with the respective ends 22a of the rollers 22, with the bores 26 of the respective rollers 22 being aligned coaxially with the unthreaded holes 46 in the respective cage frames 38, 42.

Next, the pins 50 are individually inserted through the holes 46 in the first cage frame 38 and the bores 26 in the respective rollers 22 until the threaded ends 54 of the respective pins 50 engage the corresponding unthreaded holes 46 in the second cage frame 42. Torque is applied to the torque receiving portion 62 of the pin head 58 by a wrench, machine, or other suitable source of torque in conjunction with a force along the axis 30. The torque applied to the head 58 causes the hardened, threaded end 54 of the pin 50 to shape or otherwise form threads into the initially unthreaded hole 46 of the second cage frame 42, thereby engaging the threaded end 54 of the pin 50 with the second cage frame 42. In the illustrated embodiment, the threaded end 54 of the pin 50 cold-forms threads in the hole 46 of the second cage frame 42 by displacing material within the hole 46 without cutting or creating chips. In other embodiments, the threaded end 54 may cut threads in the hole 46 of the second cage frame 42. The pin 50 is threaded into the second cage frame 42 until a distal surface 66 of the threaded end 54 is at least flush with a peripheral surface 70 of the second cage frame 42. This process is repeated for each of the plurality of pins 50 and rollers 22 until all of the rollers 22 are secured to the cage assembly 34. Lastly, the ring 14a may be positioned on the plurality of rollers 22.

Figure 1:
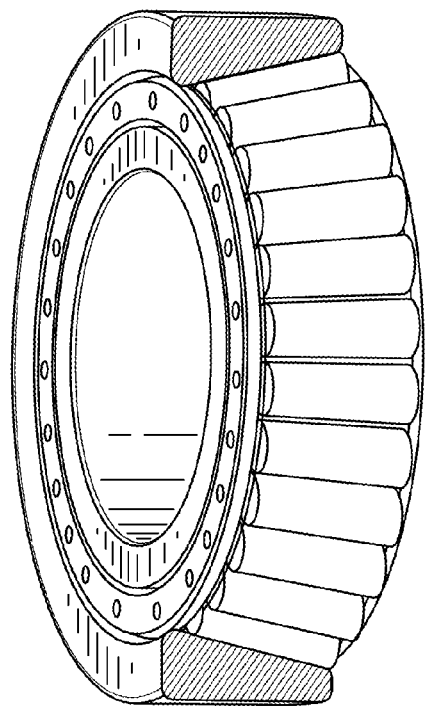
FIG. 1 is perspective view of a typical pin-type roller bearing.

In a typical pin-type roller bearing assembly as shown in FIG. 1, competing tolerances exist between the minimum torque value to which the threaded end of each pin should be tightened to the pre-threaded hole, and the protruded distance of the threaded end of each pin through the particular cage frame having the pre-threaded bores. For example, when assembling the typical pin-type roller bearing assembly of FIG. 1, it is possible that one of the specifications (e.g., the minimum torque specification) may not be achievable without conflicting with another of the specifications (e.g., the protruded distance of the pin tip). In the method according to the invention, the process of cutting or otherwise forming threads into the initially unthreaded holes 46 of the second cage frame 42 with the hardened, threaded ends 54 of the pins 50 requires that an increased amount of torque be applied to the head 58 compared to the conventional method using pre-threaded bores in one of the cage frames. The increased amount of torque sufficiently exceeds the minimum torque value to which the threaded end 54 of the pin 50 should be tightened to the hole 46 of the second cage frame 42 under current specifications using the conventional assembly method described in the Background section of the specification. Accordingly, the pin 50 can be tightened until the distal surface 66 of the threaded end 54 is at least flush with the peripheral surface 70 of the second cage frame 42 without competing or otherwise conflicting with the minimum torque value tolerance otherwise necessitated by the conventional assembly method. The pin 50 may alternatively be tightened until the distal surface 66 of the threaded end 54 protrudes a predetermined distance from the peripheral surface 70 of the second cage frame 42. In some embodiments, the pin 50 may be tightened until the distal surface 66 of the threaded end 54 protrudes less than or equal to about 0.031 inches from the peripheral surface 70 of the second cage frame 42.

In some embodiments, the head 58 of each pin 50 may be fixed to the first cage frame 38 after the threaded end 54 is fully engaged (i.e., threaded) with the second cage frame 42. This prevents the threaded ends 54 of the pins 50 from backing out of the second cage frame 42 as a result of vibration or other in-service conditions. Each of the respective heads 58 may be fixed to the first cage frame 38 by welding, brazing, or any other suitable process. In other embodiments, the heads 58 of at least two adjacent pins 50 may be interconnected with a clip or a like fixture (not shown), such that the adjacent pins 50 cannot rotate during operation, but may still be removable while servicing the bearing assembly 10 to facilitate inspection of the rollers 22. In yet other embodiments, such clips may be omitted, leaving the heads 58 of at least two adjacent pins 50 exposed to facilitate removal of the pins 50 and inspection of the rollers 22 and races 18a or 18b. In such an embodiment, the torque specification required to shape or otherwise form the threads in the holes 46 of the second cage frame 42 is sufficiently high to effectively prevent vibration or other in-service conditions from causing the pins 50 to back-out of the holes 46 in the second cage frame 42.

Various features of the invention are set forth in the following claims.

What is claimed is:

1. A method of manufacturing a bearing assembly, the method comprising:
   providing first and second cage frames, each including a plurality of holes spaced along a circumference of the respective first and second cage frames;
   positioning a plurality of rollers between the first and second cage frames, each of the rollers including a bore coaxial with a rotational axis of the respective rollers;
   aligning the bore of a first of the plurality of rollers with a first hole in each of the respective first and second cage frames;
   sliding a threaded end of a pin through the first hole in the first cage frame and the first roller a sufficient distance to engage the second cage frame, the pin also including a head opposite the threaded end; and
   rotating the pin to form a screw thread in the first hole of the second cage frame with the threaded end of the pin.

2. The method of claim 1, wherein rotating the pin includes forming the screw thread along substantially the entire length of the first hole.

3. The method of claim 2, wherein rotation of the pin continues at least until a distal surface of the threaded end is substantially flush with a peripheral surface of the second cage frame.

4. The method of claim 2, wherein rotation of the pin continues until a distal surface of the threaded end protrudes from a peripheral surface of the second cage frame.

5. The method of claim 1, wherein forming the screw thread includes displacing material within the first hole of the second cage frame.

6. The method of claim 1, wherein the first hole of the second cage frame has a tapered shape.

7. The method of claim 6, wherein the threaded end of the pin has a tapered shape.

8. The method of claim 1, wherein the threaded end of the pin has a hardness higher than that of the second cage frame.

9. The method of claim 1, wherein the pin is a first pin, and wherein the method further includes
sliding a threaded end of a second pin through a second hole in the first cage frame and a second of the plurality of rollers a sufficient distance to engage the second cage frame, and
rotating the second pin to form a screw thread in a second hole of the second cage frame with the threaded end of the second pin, thereby affixing the second roller to the first and second cages relative to the first roller.

10. The method of claim 9, further comprising interconnecting the first pin and the second pin to inhibit rotation of the first pin and the second pin relative to the first and second cage frames during operation of the bearing assembly.

11. The method of claim 1, further comprising:
providing a first ring with a first raceway and a second ring with a second raceway; and
positioning the rollers between the first and second raceways.

* * * * *